United States Patent [19]

Sato et al.

[11] 4,368,304
[45] * Jan. 11, 1983

[54] PROCESS FOR PRODUCING α-OLEFIN POLYMERS

[75] Inventors: Akihiro Sato, Chibaken; Toshihiro Uwai, Ichiharashi; Tohru Hanari, Ichiharashi; Kazutsune Kikuta, Ichiharashi; Masazumi Miyajima, Ichiharashi, all of Japan

[73] Assignee: Chisso Corporation, Osaka, Japan

[*] Notice: The portion of the term of this patent subsequent to Jan. 5, 1999, has been disclaimed.

[21] Appl. No.: 231,394

[22] Filed: Feb. 4, 1981

Related U.S. Application Data

[63] Continuation-in-part of Ser. No. 186,346, Sep. 11, 1980, abandoned, which is a continuation-in-part of Ser. No. 147,095, May 7, 1980, abandoned.

[30] Foreign Application Priority Data

Feb. 5, 1980 [JP] Japan .................................. 55-12875

[51] Int. Cl.³ .......................... C08F 4/64; C08F 10/00
[52] U.S. Cl. ................................ 526/114; 252/429 B; 526/65; 526/116; 526/119; 526/122; 526/137; 526/139; 526/140; 526/141; 526/142; 526/158; 526/159; 526/348.6; 526/351; 526/901; 526/902; 526/904; 525/247
[58] Field of Search ............... 526/114, 116, 122, 127, 526/137, 139–142, 158, 159, 119

[56] References Cited

U.S. PATENT DOCUMENTS

| | | | |
|---|---|---|---|
| 4,207,205 | 6/1980 | Wristas | 526/142 |
| 4,210,729 | 7/1980 | Hermans | 526/119 |
| 4,210,738 | 7/1980 | Hermans | 526/119 |

FOREIGN PATENT DOCUMENTS

| | | | |
|---|---|---|---|
| 51-32493 | 3/1976 | Japan | 526/142 |
| 1299863 | 12/1972 | United Kingdom | 526/901 |

Primary Examiner—Edward J. Smith
Attorney, Agent, or Firm—Fred Philpitt

[57] ABSTRACT

A process for producing α-olefin polymers is provided, which comprises: reacting an organoaluminum compound with an electron donor in a specified ratio in a solvent at a specified temperature to obtain a solid product (I); reacting solid product (I) with $TiCl_4$ at a specified temperature in a specified ratio of Al/Ti and then removing a liquid portion from the resulting material followed by washing to obtain a solid product (II) having no free $TiCl_4$; reacting solid product (II) with an electron donor and an electron acceptor in a specified ratio at a specified temperature to obtain a solid product (III); and polymerizing α-olefin(s) in the presence of a catalyst comprising a combination of solid product (III) with an organoaluminum compound. This process provides a catalyst having a high storing and thermal stability and a polymer having a uniform particle size.

11 Claims, 2 Drawing Figures

INFRARED SPECTRA

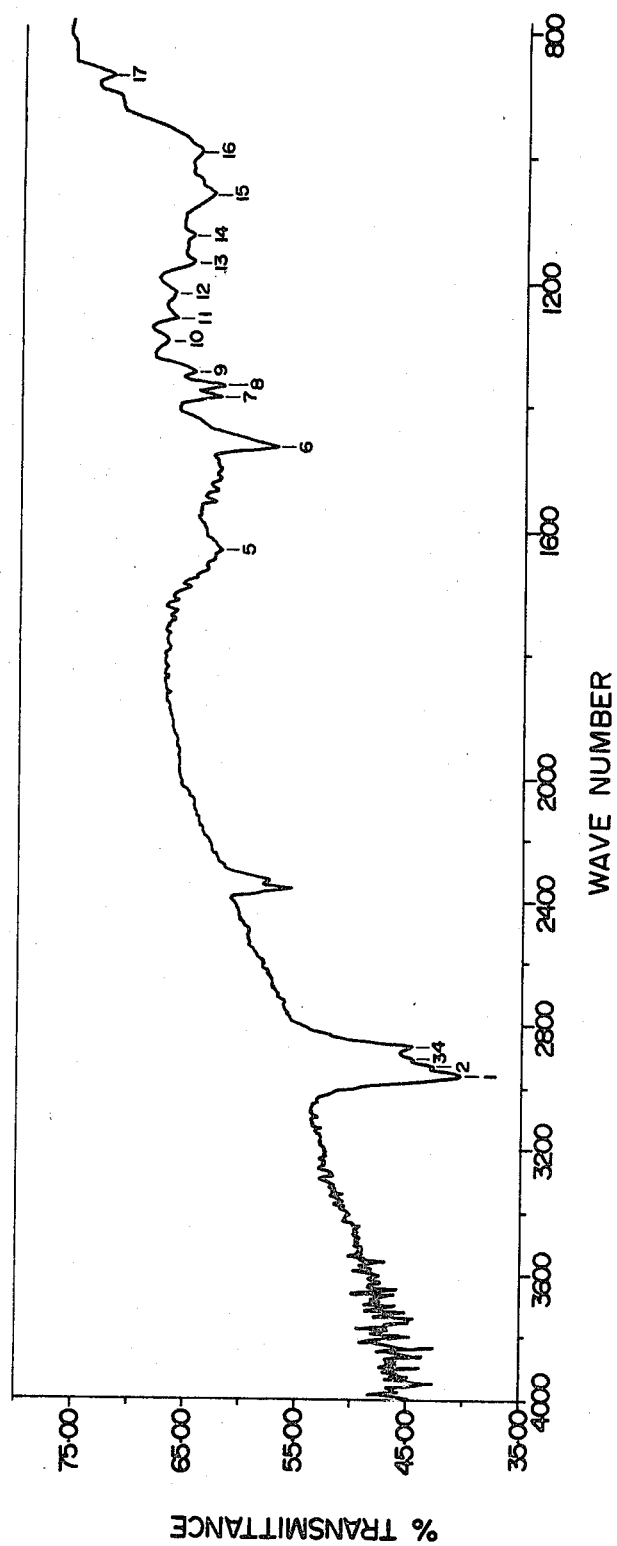

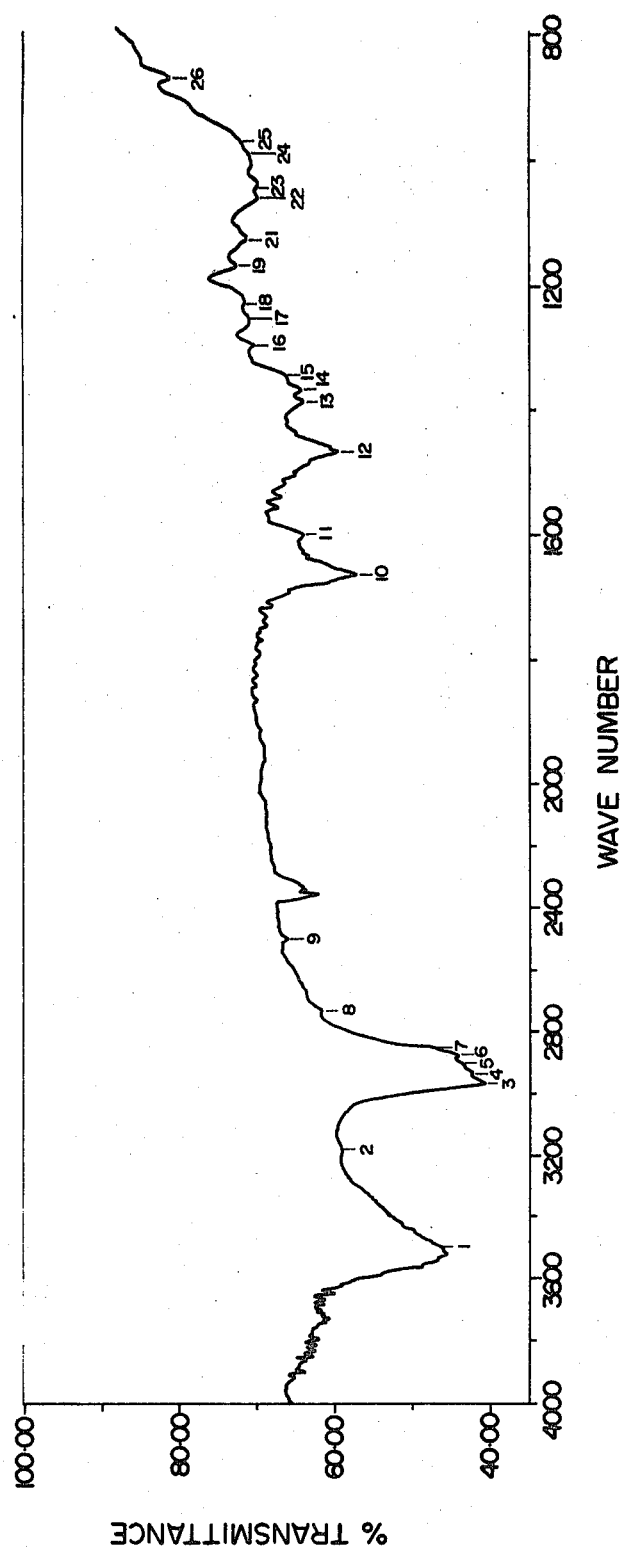

catalyst employed are both high, and further, even in the case of gas phase polymerization, there are no drawbacks as mentioned above and the advantages of gas phase polymerization can be sufficiently exhibited.

The present invention resides briefly in:

a process for producing α-olefin polymers which comprises:

reacting a reaction product (I) of an organoaluminum compound (A1) with an electron donor (B1), with TiCl$_4$ (C) to form a solid product (II);

reacting this solid product (II) further with an electron donor (B2) and an electron acceptor (E) to form a solid product (III);

combining this solid product (III) with an organoaluminum compound (A2) to obtain a catalyst; and polymerizing an α-olefin or α-olefins in the presence of this catalyst.

In the present invention, if α-olefins are polymerized in the presence of a preliminarily activated catalyst obtained by combining the solid product (III) with an organoaluminum compound as mentioned above and thereafter reacting an α-olefin with the resulting combination, then a more excellent effectiveness can be exhibited. Polymerization referred to herein is directed to any of gas phase polymerization, slurry polymerization and bulk polymerization, and particularly in the case of gas phase polymerization or a combination of slurry polymerization or bulk polymerization with gas phase polymerization, as a modification of gas phase polymerization, the advantages of gas phase polymerization can be fully exhibited.

DETAILED DESCRIPTION OF THE INVENTION

The preparation of the catalyst employed in the present invention will be mentioned below.

The preparation is carried out by preparing the solid product (III) and combining this product with an organoaluminum compound, or by further reacting the resulting combination with an α-olefin to obtain a preliminarily activated catalyst, as mentioned above.

The preparation of the solid product (III) is carried out as follows:

An organoaluminum compound is first reacted with an electron donor to obtain a reaction product (I), which is then reacted with TiCl$_4$ and thereafter further with an electron donor and an electron acceptor to obtain a solid product (II).

The reaction of an organoaluminum compound (A1) with an electron donor (B1) is carried out in a solvent (D), at a temperature of −20° to 200° C., preferably −10° to 100° C. and for a time of 30 seconds to 5 hours. The addition order of (A1), (B1) and (D) has no limitation, and the proportion of the amounts thereof employed is suitably 0.1 to 8 mols, preferably 1 to 4 mols, of an electron donor and 0.5 to 5 l, preferably 0.5 to 2 l, of a solvent, per mol of an organoaluminum. Aliphatic hydrocarbons are preferable as the solvent. Thus a reaction product (I) is obtained. The reaction product (I) may be subjected to the subsequent reaction, in a state of liquid after completion of the reaction (which liquid will be hereinafter referred to as reaction liquid (I)), as it is, without separating the solid product (I).

The reaction of the reaction product (I) with TiCl$_4$ (C) is carried out at a temperature of 0° to 200° C., preferably 10° to 90° C., for 5 minutes to 8 hours. Although it is preferable to employ no solvent, aliphatic or aromatic hydrocarbons may be employed as solvent. Addition of (I), (C) and solvent may be carried out in any order, and mixing of the total amount is preferably completed within 5 hours. As for the amounts of them employed for the reaction, the amount of solvent is 0 to 3,000 ml per mol of TiCl$_4$, and the ratio (Al/Ti) of the number of Al atoms in (I) to that of Ti atoms in TiCl$_4$ is 0.05 to 10, preferably 0.06 to 0.2. After completion of the reaction, a liquid portion is separated and removed by filtration or decantation, followed by repeated washings with solvent to obtain a solid product (II), which may be employed in the next step in a state where it is suspended in solvent, as it is, or may be further dried to employ the resulting solid product in the next step.

The solid product (II) is then reacted with an electron donor (B2) and an electron acceptor (E). Although this reaction may be carried out without employing any solvent, employment of aliphatic hydrocarbons yields preferable results. As for the amounts of them employed, 10 to 1,000 g, preferably 50 to 200 g of (B2), 10 to 1,000 g, preferably 20 to 500 g of (E) and 0 to 3,000 ml, preferably 100 to 1,000 ml of solvent, each based on 100 g of the solid product (II) are employed. It is preferable to admix these 3 or 4 substances at a temperature of −10° to 40° C. for a time of 30 seconds to 60 minutes and react them at a temperature of 40° to 200° C., preferably 50° to 100° C. for a time of 30 seconds to 5 hours. The order of addition of the solid product (II), (B2), (E) and solvent has no particular limitation, (B2) and (E) may be reacted together in advance of mixing them with the solid product (II). The reaction of (B2) with (E) is carried out at a temperature of 10° to 100° C. for a time of 30 minutes to 2 hours, and the resulting product is cooled down to 40° C. or lower and employed. After completion of the reaction of the reaction product (II), (B2) and (E), a liquid portion is separated and removed by filtration or decantation, followed by repeated washings to obtain a solid product (III), which is employed in the next step after dried and taken out as solid matter, or in a state where it is suspended in a solvent, as it is.

The solid product (III) thus prepared is in the form of spherical particles having diameters of 2 to 100 microns, preferably 10 to 70 microns, and these particles have a narrow particle size distribution in the vicinity of the average values of the above sizes. When the solid product (III) is observed with a microscope, it is seen that canals are present. The specific surface area of the solid product (III) is in the range of 125 to 200 m$^2$/g. On the other hand, the specific surface area of the solid product (II) is in the range of 100 to 120 m$^2$/g. Thus, the above higher specific surface area of the solid product (III) has been brought about by reacting an electron donor (B$_2$) and an election acceptor (E) with the solid product (II). According to the X ray diffraction spectra of the solid product (III), broad and strong diffraction is observed in the vicinity of a lattice distance d of 4.85 A, but diffraction corresponding to the surface of d=5.85 A is not observed. According to the surface infrared spectra measurement of the solid product (III), no absorption brought by hydroxyl group in the vicinity of 3,450 cm$^{-1}$ is observed. The solid product (III) has a specific feature that it is thermally stable and even when it is stored at a high temperature of 30° to 50° C., the performance of the resulting catalyst is not lowered, as described later, and such a high thermal stability is based on the above-mentioned structure of the solid product (III), which structure is formed under the production conditions according to the present invention.

PROCESS FOR PRODUCING α-OLEFIN POLYMERS

CROSS REFERENCE TO RELATED APPLICATION

The present application is a continuation-in-part of our prior application Ser. No. 186,346 (filed Sept. 11, 1980) which in turn was a continuation-in-part of our prior application Ser. No. 147,095 (filed May 7, 1980). Both of these prior applications are abandoned.

BACKGROUND OF THE INVENTION

1. Field of the Invention

This invention relates to a process for producing α-olefin polymers by the use of a novel catalyst which is suitable for α-olefin polymerization, particularly gas phase polymerization, and further, as a modification of gas phase polymerization, a combination of slurry or bulk polymerization with gas phase polymerization.

2. Description of the Prior Art

It is well known that α-olefins are polymerized by the use of so-called Ziegler-Natta catalysts comprising a compound of transition metals of IV–VI Groups of the Periodic Table and an organometallic compound of metals of I–III Groups of the Table, including modified catalysts obtained by further adding an electron donor, etc. thereto. Among the catalysts, those comprising titanium trichloride as the component of transition metal compound have been most widely employed for obtaining highly crystalline polymers of e.g. propylene, butene-1, etc. Such titanium trichloride is classified into the following three kinds according to its preparation:

(1) A material obtained by reducing $TiCl_4$ with hydrogen, followed by milling with ball mill for activation, which material has been referred to as titanium trichloride (HA).

(2) A material obtained by reducing $TiCl_4$ with metallic aluminum, followed by milling with ball mill for activation, which material is expressed by the general formula $TiCl_3 \cdot \frac{1}{3}AlCl_3$ and has been referred to as titanium trichloride (AA).

(3) A material obtained by reducing $TiCl_4$ with an organoaluminum compound, followed by heat treatment.

However, since any of these titanium trichlorides have not been satisfactory enough, various improvements have been attempted and proposed. Among them, a process has been proposed wherein a titanium trichloride obtained by reducing $TiCl_4$ with an organoaluminum compound is treated with an electron donor and $TiCl_4$ whereby the catalyst activity is enhanced and the amount of amorphous polymer byproduced is reduced (e.g. Japanese patent application laid-open No. 34478/1972). However, the catalysts obtained according to these processes have a drawback that they are deficient in the heat stability.

Further, a process has been proposed wherein $TiCl_4$ and an organoaluminum compound are separately mixed with a definite amount of a complex-forming agent (electron donors being a kind thereof), to obtain two mixture liquids which are then mixed together and reacted to prepare a solid catalyst component (Japanese patent application laid-open No. 9296/1978). However, this process, too, has a drawback that the catalyst is deficient in the heat stability, as in the case of the above Japanese patent application laid-open No. 34478/1972.

Still further, a process wherein a uniform liquid material consisting of an organoaluminum compound and an ether is added to $TiCl_4$ or $TiCl_4$ is added to the former liquid to prepare a liquid material containing titanium trichloride (Japanese patent application laid-open No. 115797/1977), as well as a process wherein the above-mentioned liquid material is heated to a temperature of 150° C. or lower to precipitate a finely particulate titanium trichloride (Japanese patent application laid-open No. 47594/1977, etc.) have been proposed.

However, these processes, too, have a drawback that the catalysts are deficient in the heat stability.

On the other hand, as for processes for polymerizing α-olefins wherein Ziegler-Natta catalysts are employed but the phase of α-olefins is varied, slurry polymerization carried out in a solvent such as n-hexane, etc. (e.g. Japanese patent publication No. 10596/1957), bulk polymerization carried out in a liquefied α-olefin monomer such as liquefied propylene (e.g. Japanese patent publication Nos. 6686/1961, 14041/1963), and gas phase polymerization carried out in a gaseous monomer such as gaseous propylene (e.g. Japanese patent publication Nos. 14812/1964, 17487/1967, etc.), have been well known. Further, a process of bulk polymerization followed by gas phase polymerization has been also known (e.g. Japanese patent publication No. 14862/1974, Japanese patent application laid-open No. 135987/1976, etc.). Among these polymerization processes, gas phase one is advantageous in that recovery and reuse of solvent employed in polymerization as in the case of slurry polymerization process are unnecessary; recovery and reuse of liquefied monomer such as liquefied propylene as in the case of bulk polymerization process are unnecessary; hence the cost of solvent or monomer recovery is small to simplify the equipments for producing α-olefin polymers; etc. In the case of gas phase polymerization process, however, uneven catalyst particles are liable to result in uneven polymer particles. This is, in turn, liable to cause cohesion of polymer particles and clogging of polymer-discharging port of polymerization vessel or transportation line, to make difficult its long time, stabilized, continuous operation and also make the quality dispersion of polymers larger.

The present inventors have previously invented a polymerization process free of the above-mentioned drawbacks even in the case of gas phase polymerization, that is, a process for producing α-olefin polymers using a catalyst prepared by reacting a reaction product of an electron donor with an organoaluminum compound, with $TiCl_4$, in the presence of an aromatic compound to form a solid product, or reacting this solid product further with an electron donor to form a solid product; and combining the solid product thus obtained, with an organoaluminum compound.

The inventors have further continued studies, and as a result, have found a novel catalyst and found that when α-olefins are polymerized employing this catalyst, a superior polymerization to the prior invention can be effected, and yet even in the gas phase polymerization, the drawbacks of conventional processes as described above can be much overcome. Thus the present invention has been achieved.

SUMMARY OF THE INVENTION

The object of the present invention is to provide a process for producing α-olefin polymers according to which the particle size of the resulting polymers is uniform, and the storing stability and heat stability of the The preliminary activation is preferably carried out employing 0.1 to 500 g of an organoaluminum, 0 to 50 l of a solvent, 0 to 1,000 ml of hydrogen and 0.05 to 5,000 g, preferably 0.05 to 3,000 g of an α-olefin, each based on 1 g of the solid product (III), and reacting the α-olefin at a temperature of 0° to 100° C. for a time of one minute to 20 hours to thereby give 0.01 to 2,000 g, preferably 0.05 to 200 g of reacted α-olefin.

The reaction of α-olefins for the preliminary activation may be carried out in a solvent of aliphatic or aromatic hydrocarbons, or in a liquefied α-olefin such as liquefied propylene, liquefied butene-1, etc. Further it is also possible to react an α-olefin such as ethylene, propylene, etc. in gas phase. Further, it is also possible to carry out the activation in the coexistence of an α-olefin polymer prepared in advance or hydrogen.

As for the method for the preliminary activation, there are various embodiments such as (1) a method wherein slurry reaction, bulk reaction or gas phase reaction is carried out by contacting an α-olefin with a catalyst obtained by combining the solid product (III) with an organoaluminum; (2) a method wherein the solid product (III) is combined with an organoaluminum in the presence of an α-olefin; (3) a method according to the methods (1) or (2) wherein an α-olefin polymer is made coexistent; (4) a method according to the methods (1), (2) or (3) wherein hydrogen is made coexistent; etc.

As for α-olefins employed for the preliminary activation, straight chain monoolefins such as ethylene, propylene, butene-1, hexene-1, heptene-1, octene-1, decene-1, etc., branched chain monoolefins such as 4-methyl-pentene-1, 2-methyl-pentene-1,3-methyl-butene-1, etc. and styrene, etc. are mentioned. These α-olefins may be same as or different from those to be polymerized employing the preliminarily activated catalyst, and may be employed in admixture.

After completion of the preliminary activation, solvent and unreacted α-olefin are removed by e.g. distilling off under reduced pressure, and after drying, the resulting powder may be employed for the subsequent polymerization, or it is possible to suspend the solid product in a solvent in an amount of 80 l or less per g of the solid product and employ the resulting suspension for the subsequent polymerization.

The preliminarily activated catalyst thus prepared may be employed for slurry polymerization of α-olefins carried out in a hydrocarbon solvent such as n-hexane, n-heptane, n-octane, benzene, toluene, etc. or bulk polymerization carried out in a liquefied α-olefin monomer e.g. liquefied propylene, liquefied butene, etc., but it may be preferably employed particularly for gas phase polymerization, and even in the case of a modification of gas phase polymerization i.e. slurry polymerization followed by gas phase polymerization or bulk polymerization followed by gas phase polymerization, a desirable effectiveness is exhibited.

Gas phase polymerization of α-olefins may be carried out in the absence of solvent such as n-hexane, n-heptane, etc., and besides, may be carried out in a state where 0 to 500 g of a solvent per kg of α-olefin polymer particles is contained. Further, it may be carried out either continuously or batchwise. Furthermore, it may be carried out in a fluidized bed manner, in a manner of fluidization provided with agitating elements or a manner of vertical or horizontal type paddle agitation.

α-Olefin polymerization by way of slurry or bulk polymerization followed by gas phase polymerization may be batchwise carried out. For example, (1) a method wherein after slurry or bulk polymerization, solvent or liquefied α-olefin is removed, and successively gas phase polymerization is carried out under feed of gaseous α-olefin; (2) a method wherein slurry or bulk polymerization is carried out, and while the polymerization is continued without removing solvent or α-olefin, the solvent or liquefied α-olefin is contained in polymer particles whereby liquid portion is lost; hence the former polymerization turns continuously to gas phase polymerization; (3) a method wherein slurry or bulk polymerization is continued until 500 g or less of solvent or α-olefin per kg of polymer particles containing a solvent is contained, followed by gas phase polymerization while feeding an α-olefin in gas phase; etc.

Such a plural step polymerization consisting of a combination of slurry or bulk polymerization with gas phase polymerization, exhibits desirable results particularly in the case of continuous polymerization. According to the method, for example, slurry or bulk polymerization is carried in the first step, and this polymerization is continued until polymer particles containing 30% or less of solvent or liquefied α-olefin are obtained, or solvent or liquefied α-olefin is removed and thereafter gas phase polymerization of α-olefin of the second step is carried out under fluidization of polymer particles.

The catalyst of the first step is employed as it is, in the gas phase polymerization of the second step, but even if a fresh catalyst is added in the second step, this does not hinder the effectiveness of the present invention. The two-step polymerization is preferably carried out so that the proportion of the weight of polymer by way of slurry or bulk polymerization and that of polymer by way of gas phase polymerization, in the final polymer, may be 0.1 to 100 parts of the latter based on 1 part of the former.

As for the polymerization conditions of α-olefins, any of slurry polymerization, bulk polymerization and gas phase polymerization may be carried out at a polymerization temperature of room temperature (20° C.) to 200° C., under a polymerization pressure of the atmospheric pressure (0 kg/cm$^2$G) to 50 kg/cm$^2$G and usually for 5 minutes to 10 hours. In the polymerization, addition of a suitable amount of hydrogen for adjustment of molecular weight, and the like means are carried out as in conventional manner.

As for the α-olefins employed in the polymerization of the present invention, straight chain monoolefins such as ethylene, propylene, butene-1, hexene-1, octene-1, etc., branched chain monoolefins such as 4-methyl-pentene-1, 2-methyl-pentene-1, 3-methyl-butene-1, etc., diolefins such as butadiene, isoprene, chloroprene, etc., styrene, etc. are mentioned. These olefins may be homopolymerized or copolymerized in combination with each other, for example, in combination of propylene with ethylene; butene with ethylene; and propylene with butene-1. In this case, they may be polymerized in admixture of monomers or in a plurality of steps where different α-olefins may be employed in the first step slurry or bulk polymerization and the second step gas phase polymerization.

The first effectiveness of the present invention is that the average particle diameter of polymer is small; the particle form is close to sphere; and the particle size distribution is small and the amounts of large particles and fine particles are reduced. Thus, even when gas phase polymerization is carried out, the flow of polymer particles is smooth and a long time stabilized, continu- The solid product (III) obtained above is combined with an organoaluminum compound in a proportion of 0.1 to 500 g of the latter per g of the former to obtain a catalyst, or this catalyst is further reacted with an α-olefin to obtain a preliminarily activated catalyst.

The organoaluminum compounds employed in the present invention are expressed by the general formula $AlR_nR'_nX_{3-(n+n')}$ wherein R and R' each represent a hydrocarbon group such as alkyl group, aryl group, alkaryl group, cycloalkyl group, etc. or alkoxy group; X represents a halogen such as fluorine, chlorine, bromine or iodine; and n and n' each represent an optional number $0 < n+n' \leq 3$, and as concrete examples, trialkylaluminums such as trimethylaluminum, triethylaluminum, tri-n-propylaluminum, tri-n-butylaluminum, tri-i-butylaluminum, tri-n-hexylaluminum, tri-i-hexylaluminum, tri-2-methylpentylaluminum, tri-n-octylaluminum, tri-n-decylaluminum, etc., dialkylaluminum monohalides such as diethylaluminum monochloride, di-n-propylaluminum monochloride, di-i-butylaluminum monochloride, diethylaluminum monofluoride, diethylaluminum monobromide, diethylaluminum monoiodide, etc.; alkylaluminum hydrides such as diethylaluminum hydride; and alkylaluminum halides such as methylaluminum sesquichloride, ethylaluminum sesquichloride, ethylaluminum dichloride, i-butylaluminum dichloride, etc. are mentioned. Besides, alkoxyalkylaluminums such as monoethoxydiethylaluminum, diethoxymonoethylaluminum, etc. may be also employed. These organoaluminums may be employed in admixture of two or more kinds. The organoaluminum compound (A1) for obtaining the solid product (I) may be the same as or different from the organoaluminum compound (A2) to be combined with the solid product (III).

As for the electron donors employed in the present invention, various kinds are illustrated below, but it is preferable that electron donors composed singly or mainly (more than 50% by mol based on the total mols thereof) of ethers be employed and those other than ethers be employed together with ethers. As for the electron donors employed, organic compounds containing at least one atom of oxygen, nitrogen, sulfur and phosphorus, such as ethers, alcohols, esters, aldehydes, fatty acids, aromatic acids, ketones, nitriles, amines, amides, urea, thiourea, isocyanates, azo compounds, phosphines, phosphites, phosphinites, thioethers, thioalcohols, etc. are mentioned. As for concrete examples, ethers such as diethyl ether, di-n-propyl ether, di-n-butyl ether, diisoamyl ether, di-n-pentyl ether, di-n-hexyl ether, di-i-hexyl ether, di-n-octyl ether, di-i-octyl ether, di-n-dodecyl ether, diphenyl ether, ethylene glycol monomethyl ether, diethylene glycol dimethyl ether, tetrahydrofuran; alcohols such as methanol, ethanol, propanol, butanol, pentanol, hexanol, octanol, phenol, cresol, xylenol, ethylphenol, naphthol; esters such as methyl methacrylate, ethyl acetate, butyl formate, amyl acetate, vinyl lactate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate; aldehydes such as acetaldehyde, benzaldehyde; fatty acids such as formic acid, acetic acid, propionic acid, lactic acid, oxalic acid, succinic acid, acrylic acid, maleic acid; aromatic acids such as benzoic acid; ketones such as methyl ethyl ketone, methyl isobutyl ketone, benzophenone; nitriles such as acetonitrile; amines such as methylamine, diethylamine, tributylamine, triethanolamine, β(N,N-dimethylamino) ethanol, pyridine, quinoline, α-picoline, N,N,N',N'-tetramethylhexaethylenediamine, aniline, dimethylaniline; amides such as formamide, hexamethyl phosphoric acid triamide, N,N,N',N',N''-pentamethyl-N'-β-dimethylaminoethyl phosphoric acid triamide, octamethylpyrophosphoroamide; ureas such as N,N,N',N'-tetramethylurea; isocyanates such as phenylisocyanate, toluylisocyanate; azo compounds such as azobenzene; phosphines such as ethylphosphine, triethylphosphine, tri-n-butylphosphine, tri-n-octylphosphine, triphenylphosphine, triphenylphosphine oxide; phosphites such as dimethylphosphite, di-n-octylphosphite, triethylphosphite, tri-n-butylphosphite, triphenylphosphite; phosphinites such as ethyldiethylphosphinite, ethyldibutylphosphinite, phenyldiphenylphosphinite; thioethers such as diethyl thioether, diphenyl thioether, methyl phenyl thioether, ethylene sulfide, propylene sulfide; and thioalcohols such as ethyl thioalcohol, n-propyl thioalcohol, thiophenol, are mentioned. These electron donors may be employed in admixture. The electron donor (B1) for obtaining the reaction product (I) may be the same as or different from the electron donor (B2) to be reacted with the solid product (II).

The electron acceptors employed in the present invention are represented by halides of elements of III Group to VI Group of the Periodic Table. As concrete examples, anhydrous $AlCl_3$, $SiCl_4$, $SnCl_2$, $SnCl_4$, $TiCl_4$, $ZrCl_4$, $PCl_3$, $PCl_5$, $VCl_4$, $SbCl_5$, etc. are mentioned. They may be employed in admixture. $TiCl_4$ is most preferable.

As for the solvent, the following ones are employed: As aliphatic hydrocarbons, n-heptane, n-octane, i-octane, etc. are mentioned. Further, in place of the aliphatic hydrocarbons or together therewith, halogenated hydrocarbons such as carbon tetrachloride, chloroform, dichloroethylene, trichloroethylene, tetrachloroethylene, etc. may be also employed. As for aromatic compounds, aromatic hydrocarbons such as naphthalene, and as their derivatives, alkyl substitutes such as mesitylene, durene, ethylbenzene, isopropylbenzene, 2-ethylnaphthalene, 1-phenylnaphthalene, etc., and halides such as monochlorobenzene, o-dichlorobenzene, etc. are mentioned.

The solid product (III) thus obtained is then combined with an organoaluminum compound to obtain a catalyst, which is then employed for α-olefin polymerization in conventional manner, or further reacted with an α-olefin to obtain a preliminarily activated catalyst which is then employed for α-olefin polymerization.

In the case of slurry or bulk polymerization, even a catalyst obtained by combining the solid product (III) with an organoaluminum compound exhibits a sufficient effectiveness, but, in the case of gas phase polymerization, a preliminarily activated catalyst obtained by reacting an α-olefin with the above-mentioned catalyst is preferable since this activated catalyst exhibits a higher activity. In the case of slurry or bulk polymerization followed by gas phase polymerization, even when the former catalyst (unactivated one) is initially employed, since this former catalyst has already been reacted wtih an α-olefin before the subsequent gas phase polymerization, the resulting catalyst is similar to the latter catalyst (preliminarily activated catalyst), and exhibits a superior effectiveness.

COMPARATIVE EXAMPLE 3

Example 1 was repeated except that diisoamyl ether (0.12 mol, 19 g) was not employed in the formation reaction of the reaction product (I), but this amount 19 g was added to 16 g of diisoamyl ether employed in the subsequent reaction with the solid product (II).

COMPARATIVE EXAMPLE 4

Example 1 was repeated except that, in the formation reaction of solid product (III) of Example 1, TiCl₄ to be reacted with solid product (II) was not employed.

COMPARATIVE EXAMPLE 5

Example 1 was repeated except that no diisoamyl ether was reacted in the formation reaction of solid product (II) of Example 1.

COMPARATIVE EXAMPLE 6

Example 1 was repeated except that solid product (II) of Example 1 was replaced by a product obtained by adding 0.05 mol of diethylaluminum chloride to a solution consisting of 0.4 mol of TiCl₄ and 0.12 mol of diisoamyl ether at 35° C. for 30 minutes, maintaining the mixture at the same temperature, elevating the temperature to 75° C. and further reacting them together for one hour.

COMPARATIVE EXAMPLE 7

Example 1 was repeated except that unreacted TiCl₄ was not removed from the reaction material after the formation reaction of the solid product (II), but the volume of the reaction material was made 400 ml with n-hexane, and the resulting material was employed for the subsequent reaction.

The results of Example 1 and Comparative examples 1 to 7 are shown in Table 1.

TABLE 1

| No. | Polymer yield per g of solid catalyst component | Isotactic index | Polymer BD | Proportion of 32 to 60 meshes pass (%) | 4 meshes on (%) | MFR* | YI** |
|---|---|---|---|---|---|---|---|
| Example 1 | 5,200 | 99.8 | 0.50 | 97.4 | 0 | 4.2 | 3.0 |
| Compar. ex. 1 | 1,100 | 98.5 | 0.40 | 60.0 | 30 | 3.9 | 17.5 |
| Compar. ex. 2 | 80 | 96.5 | 0.25 | 60.0 | 34 | 4.3 | >20 |
| Compar. ex. 3 | 50 | — | — | — | — | — | |
| Compar. ex. 4 | 2,800 | 95.0 | 0.40 | 80.0 | 12 | 4.5 | 8.8 |
| Compar. ex. 5 | 1,800 | 98.0 | 0.40 | 58.3 | 10 | 4.1 | 9.9 |
| Compar. ex. 6 | 1,400 | 96.0 | 0.40 | 56.0 | 15 | 4.3 | 12.6 |
| Compar. ex. 7 | 1,900 | 95.0 | 0.41 | 54.0 | 22 | 3.5 | 9.0 |

*Melt flow rate (according to ASTM D-1238 (L))
**Yellowness index (according to JIS K7103)

EXAMPLE 2

Example 1 was repeated except that, in the formation reaction of solid product (II) of Example 1, while TiCl₄ was maintained at 12° C., the reaction liquid (I) was dropwise added thereto at 12° C. for 45 minutes, and the resulting mixture was maintained at 35° C. for 60 minutes. The resulting solid product (III) had a brown color.

EXAMPLE 3

Example 1 was repeated except that, in the formation reaction of solid product (II) of Example 1, the elevated temperature 75° C. after dropwise addition of reaction liquid (I) to TiCl₄ was changed to 65° C. The resulting solid product (III) had a brown color.

EXAMPLE 4

In place of the reaction of diisoamyl ether and TiCl₄ with the solid product (II) in Example 1, diisoamyl ether (38 g), SiCl₄ (12 g) and TiCl₄ (17 g) were added to 200 ml of n-hexane at room temperature (20° C.) for about one minute, and thereafter solid product (II) (19 g) was added, followed by reaction at 75° C. for 2 hours, washing with n-hexane and drying to obtain a solid product (III). Thereafter, preliminary activation of catalyst and propylene polymerization were carried out as in Example 1, (2) and (3).

The results of Examples 2 to 4 are shown in Table 2.

TABLE 2

| No. | Polymer yield per g of solid catalyst component | Isotactic index | Polymer BD | Proportion of 32 to 60 meshes pass (%) | 4 meshes on (%) | MFR | YI |
|---|---|---|---|---|---|---|---|
| Example 2 | 5,100 | 98.9 | 0.49 | 96.5 | 0 | 4.3 | 3.0 |
| Example 3 | 5,000 | 98.5 | 0.50 | 98.0 | 0 | 4.2 | 3.1 | ous operation is possible and hence the merit of gas phase polymerization is exhibited. Namely, in the case of gas phase polymerization alone, it is possible to minimize the recovery cost of solvent and monomer. Further, in the case of slurry or bulk polymerization followed by gas phase polymerization, it is possible to make the concentration of solvent or liquefied α-olefin contained in polymer, 30% or lower in the slurry or bulk polymerization of the first step, and vaporize unreacted monomer by way of heat of polymerization reaction in the gas phase polymerization successively carried out.

The second effectiveness of the present invention is that the storing stability of catalyst is increased. Thus, even when the solid product (III) is allowed to stand at a high temperature of about 30° C. for about 4 months, a large reduction in the polymerization activity does not occur; hence a particular storing equipment e.g. for storing the solid product (III) at about 0° C. is unnecessary. Further, even when the solid product (III) is allowed to stand in a high concentration of 1.0% or higher at 30° C. or higher, for about one week since the time of combination of the solid product (III) with an organoaluminum till the time of polymerization initiation, fine pulverization brought about by agitation in the catalyst tank hardly occurs; the form of polymer particles is not degraded; and no reduction in the polymerization activity is observed. This effectiveness is further enhanced by preliminary activation of catalyst with an α-olefin.

The third effectiveness of the present invention is that the heat stability of catalyst during polymerization is improved. Thus, even when polymerization is carried out at a relatively high temperature of 70° C. or higher, the resulting polymer particles are not finely pulverized, and further, in the case of slurry polymerization, they are not wetted by solvent. Accordingly, the allowable temperature range of temperature control during the operation of the polymerization vessel is extended, resulting in a long time stabilized operation.

The fourth effectiveness of the present invention is that polymer particles having a high bulk density (BD) is obtained. The BD of polymer amounts to 0.45 to 0.52, and a small volume of polymerization vessel or storing tank based upon the weight of polymer may be sufficient.

The fifth effectiveness of the present invention is that a highly crystalline α-olefin polymer is obtained. For example, in the production of propylene polymers, the isotactic index (a ratio of parts by weight of isotactic polypropylene as n-hexane insoluble (at 20° C.) to 100 parts by weight of the total polymer formed) amounts to 98 to 99.8, and physical properties, particularly rigidity of polymer are not reduced even without removing atactic polymer; hence it is possible to omit the removal step of atactic polymer.

The present invention will be further illustrated by way of the following Examples.

EXAMPLE 1

(1) Preparation of catalyst n-Hexane (60 ml), diethylaluminum monochloride (DEAC) (0.05 mol) and diisoamyl ether (0.12 mol) were mixed together at 25° C. for one minute, and then reacted at the same temperature for 5 minutes to obtain a reaction liquid (I) (the molar ratio of diisoamyl ether/-DEAC being 2.4). TiCl$_4$ (0.4 mol) was introduced into a reactor purged by nitrogen and heated to 35° C. To this material was dropwise added the total amount of the above-mentioned reaction liquid (I) for 30 minutes, and they were maintained at the same temperature for 30 minutes, followed by elevating the temperature to 75° C., further reacting for one hour, cooling down to room temperature to remove the supernatant, and repeating a procedure of adding 400 ml of n-hexane and removing the supernatant by decantation, 4 times to obtain 19 g of a solid product (II). The total amount of this (II) was suspended in 300 ml of n-hexane, and to the resulting suspension were added 16 g of diisoamyl ether and 35 g of TiCl$_4$ at 20° C. for about one minute, followed by reaction at 65° C. for one hour. After completion of the reaction, the resulting material was cooled down to room temperature (20° C.), followed by removing the supernatant by decantation, repeating a procedure of adding 400 ml of n-hexane, stirring for 10 minutes, still standing and removing the supernatant, 5 times, and drying under reduced pressure to obtain a solid product (III).

(2) Preparation of preliminarily activated catalyst

A 2 l capacity stainless steel reactor equipped with slanted blades was purged by nitrogen gas, and then to this reactor were added at room temperature, n-hexane (20 ml), diethylaluminum monochloride (420 mg) and the solid product (III) (30 mg). Thereafter, 150 ml of hydrogen was introduced, and reaction was carried out under a partial pressure of propylene of 5 kg/cm$^2$ G for 5 minutes, followed by removing unreacted propylene, hydrogen and n-hexane under reduced pressure to obtain a powdery preliminarily activated catalyst (reacted propylene: 80.0 g per g of solid product (III).

(3) Polymerization of propylene

Into the above-mentioned reactor containing the above-mentioned preliminarily activated catalyst was introduced 300 ml of hydrogen, and gas phase polymerization was carried out under a partial pressure of propylene of 25 kg/cm$^2$G at a polymerization temperature of 70° C. for 2 hours. After completion of the reaction, 5 g of methanol was added and killing reaction was carried out at 70° C. for 30 minutes, followed by cooling down to room temperature and drying the resulting polymer to obtain 156 g of polymer. The polymer yield was 5,200 g per g of solid product (III); isotactic index, 99.8; and BD, 0.50. The form of the polymer particles was close to sphere; 97.4% of the polymer particles had a size between 32 meshes and 60 meshes; and neither fine powder nor lump was observed. Further, no colored polymer was observed and the yellowness index was 3.0.

COMPARATIVE EXAMPLE 1

Example 1 was repeated except that the solid product (II) was employed in place of the solid product (III).

COMPARATIVE EXAMPLE 2

A solid product corresponding to the solid product (III) was prepared as in Example 1 except that no isoamyl ether was employed in the formation reaction of the solid product (II) (solid products to be combined with an organoaluminum compound, as obtained in Comparative examples will be hereinafter referred to as final solid product, and the solid product (III) and such final solid product will be hereinafter referred to collectively as solid catalyst component) and this final solid product was preliminarily activated as in Example 1. With this activated catalyst, propylene was polymerized as in Example 1.

TABLE 2-continued

| No. | Polymer yield per g of solid catalyst component | Isotactic index | Polymer BD | Proportion of 32 to 60 meshes pass (%) | 4 meshes on (%) | MFR | YI |
|---|---|---|---|---|---|---|---|
| Example 4 | 5,200 | 99.2 | 0.50 | 92.0 | 0 | 4.3 | 3.0 |

EXAMPLE 5 n-Heptane (80 ml), di-n-butylaluminum monochloride (0.16 mol) and di-n-butyl ether (0.10 mol) were mixed together at 30° C. for 3 minutes, and reacted for 20 minutes to obtain a reaction liquid (I). The total amount of this reaction liquid (I) was dropwise added over 60 minutes to a solution consisting of 50 ml of toluene and 0.64 mol of TiCl$_4$, maintained at 45° C. The temperature was then elevated to 85° C. and further, reaction was carried out for 2 hours, followed by cooling down to room temperature to remove the supernatant, and twice repeating a procedure of adding 300 ml of n-heptane and removing the supernatant by decantation, to obtain 49 g of a solid product (II). The total amount of this product (II) was suspended in 300 ml of n-heptane, and 20 g of di-n-butyl ether and 150 g of TiCl$_4$ were added to the suspension obtained above, at room temperature for about 2 minutes, followed by reaction at 90° C. for 2 hours, cooling, decantation, washing with n-heptane and drying to obtain a solid product (III). Thereafter, preliminary activation of catalyst and propylene polymerization were carried out as in Example 1, (2) and (3).

COMPARATIVE EXAMPLE 8

Example 5 was repeated except that solid product (II) of Example 5 was employed in place of solid product (III).

EXAMPLE 6

Diethylaluminum monochloride (0.057 mol) and diisoamyl ether (0.15 mol) were dropwise added to n-hexane (40 ml) at 18° C. for 5 minutes, and they were reacted at 35° C. for 30 minutes. The resulting reaction liquid was dropwise added to 0.5 mol of TiCl$_4$ at 35° C. for 180 minutes, and they were then maintained at 35° C. for 60 minutes, followed by elevating the temperature to 75° C., heating for 60 minutes, cooling down to room temperature (20° C.), removing the supernatant, and twice repeating a procedure of adding 400 ml of n-hexane and removal by decantation to obtain 24 g of a solid product (II). The total amount of this product was suspended in 100 ml of n-hexane, and to the resulting suspension was added 12 g of diisoamyl ether, followed by reaction at 35° C., for one hour. Further, 12 g of diisoamyl ether and 72 g of TiCl$_4$ were added at 35° C. for 2 minutes, followed by elevating the temperature to 65° C., reaction for one hour, cooling down to room temperature (20° C.), decantation, washing with n-hexane and drying to obtain a solid product (III). The subsequent preparation of preliminarily activated catalyst and propylene polymerization were carried out as in Example 1.

EXAMPLE 7

Example 6 was repeated except that, in the formation reaction of reaction product (I), 0.06 mol of diisopropylaluminum monochloride was reacted with 0.14 mol of di-n-octyl ether.

EXAMPLE 8

Example 6 was repeated except that, in the formation reaction of solid product (II), the amount of TiCl$_4$ to be reacted with solid product (I) was changed to 0.72 mol.

EXAMPLE 9

The solid product (II) (24 g) obtained in the same manner as in Example 6 was suspended in 200 ml of toluene, and to the resulting suspension were added 10 g of TiCl$_4$ and 26 g of di-n-butyl ether, followed by reaction at 50° C. for 180 minutes, cooling down to room temperature (20° C.), decantation, washing with n-hexane and drying to obtain solid product (III). The subsequent preparation of preliminarily activated catalyst and propylene polymerization were carried out as in Example 1.

EXAMPLE 10

Triisobutylaluminum (0.03 mol) and di-n-dodecyl ether (0.07 mol) were reacted together in n-hexane (100 ml) at 20° C. for 30 minutes. The resulting reaction liquid was dropwise added to TiCl$_4$ (0.15 mol) at 20° C. for 120 minutes, and then the temperature was maintained at 30° C. for 30 minutes, followed by elevating the temperature to 50° C., reaction for 60 minutes, removing the supernatant by decantation, washing with n-hexane and drying to obtain 23 g of a solid product (II), which was then suspended in 50 ml of n-heptane. To the resulting suspension were added 21 g of di-n-butyl ether and 40 g of TiCl$_4$, followed by reaction at 50° C. for 140 minutes, cooling, decantation of supernatant, washing with n-hexane and drying to obtain a solid product (III). The subsequent preparation of preliminarily activated catalyst and propylene polymerization were carried out as in Example 1.

Example 11

Triethylaluminum (0.07 mol) and di-n-propyl ether (0.15 mol) were mixed together in n-octane (45 ml) at 20° C. for 2 minutes, and reacted at the same temperature for 30 minutes to obtain a reaction product (I), which was then dropwise added to TiCl$_4$ (0.6 mol) at 32° C. for 4 hours and temperature was maintained at 35° C. for one hour, followed by elevating the temperature to 78° C., reaction for 2 hours, cooling down to 20° C., removing the supernatant, repeating a procedure of adding 400 ml of n-hexane and removing the supernatant by decantation, 5 times, confirming no detection of TiCl$_4$, filtration and drying to obtain 23 g of a solid product (II).

Di-n-pentyl ether (47 mol) and anhydrous AlCl$_3$ (5 g) were added to n-heptane (300 ml) and reaction was carried out at 80° C. for 2 hours to dissolve the anhydrous AlCl$_3$, followed by cooling down to 30° C., adding 23 g of the above-mentioned solid product (II), reaction at 80° C. for 2 hours, cooling down to room temperature, removing the supernatant by decantation, repeating a procedure of adding 300 ml of n-hexane and removing the supernatant by decantation, three times, filtration and drying to obtain a solid product (III). The subsequent preparation of preliminarily activated catalyst and propylene polymerization were carried out as in Example 1, (2) and (3).

The results of Examples 5 to 11 and Comparative example 8 are shown in Table 3.

TABLE 3

| No. | Polymer yield per g of solid catalyst component | Isotactic index | Polymer BD | Proportion of 32 to 60 meshes pass (%) | 4 meshes on (%) | MFR | YI |
| --- | --- | --- | --- | --- | --- | --- | --- |
| Example 5 | 5,100 | 99.6 | 0.50 | 94.8 | 0 | 3.8 | 2.9 |
| Compar. ex. 8 | 3,100 | 98.6 | 0.40 | 80.0 | 12 | 4.5 | 8.1 |
| Example 6 | 5,900 | 99.0 | 0.50 | 96.8 | 0 | 3.6 | 1.8 |
| Example 7 | 5,000 | 98.4 | 0.46 | 90.0 | 0 | 3.8 | 3.1 |
| Example 8 | 5,600 | 99.0 | 0.48 | 95.0 | 0 | 3.6 | 2.0 |
| Example 9 | 5,200 | 99.0 | 0.50 | 93.8 | 0 | 3.3 | 2.1 |
| Example 10 | 5,000 | 98.6 | 0.45 | 92.1 | 0 | 3.8 | 3.1 |
| Example 11 | 5,100 | 99.5 | 0.50 | 94.8 | 0 | 4.1 | 3.5 |

EXAMPLE 12 n-Pentane (4 ml), diethylaluminum monochloride (160 mg), solid product (III) obtained in Example 1 (32 mg) and polypropylene powder (5 g) were introduced and mixed together in the reactor of Example 1, (2), followed by removing n-pentane under reduced pressure. Gas phase reaction was carried out under a partial pressure of propylene of 0.8 kg/cm$^2$ G at 30° C. for 20 minutes while the catalyst was fluidized with propylene, followed by removing unreacted propylene to obtain a preliminarily activated catalyst (reacted propylene per g of solid product (III): 1.8 g). Employing the resulting catalyst, gas phase polymerization of propylene was carried out as in Example 1, (3).

EXAMPLE 13

Di-n-butylaluminum chloride (120 mg) and solid product (III) (25 mg) obtained in Example 5 were introduced in propylene (30 g) at 20° C., and reaction was carried out under a partial pressure of propylene of 9.8 kg/cm$^2$ G for 10 minutes, followed by removing unreacted propylene to obtain a powdery preliminarily activated catalyst (reacted propylene per g of solid product (III): 120 g). Employing the resulting catalyst, gas phase polymerization was carried out as in Example 1 (3).

EXAMPLE 14

Example 1 was repeated except that, in the preliminary activation of Example 1, ethylene was employed in place of propylene, and ethylene was reacted under a partial pressure of ethylene of 1 kg/cm$^2$ G at 35° C. for 10 minutes (reacted ethylene per g of solid product (III): 2.4 g).

EXAMPLE 15

Example 1 was repeated except that, in the preliminary activation of Example 1, butene-1 was employed in place of propylene, and butene-1 was reacted under a partial pressure of butene-1 of 0.5 kg/cm$^2$ G at 35° C. for 10 minutes (reacted butene-1 per g of solid product (III): 0.3 g).

EXAMPLE 16

Example 1 was repeated except that, in Example 1, (2), 380 mg of diisopropylaluminum monochloride was employed in place of 420 mg of diethylaluminum monochloride.

EXAMPLE 17

Preliminary activation of Example 1 (2) was repeated except that 320 mg of triethylaluminum was employed in place of 420 mg of diethylaluminum monochloride in Example 1, (2). Thereafter, polymerization of Example 1 (3) was repeated except that ethylene was polymerized under a pressure of hydrogen of 12 kg/cm$^2$G and a partial pressure of ethylene of 12 kg/cm$^2$G, at 85° C.

The results of Examples 12 to 17 are shown in Table 4.

TABLE 4

| No. | Polymer yield per g of solid catalyst component | Isotactic index | polymer BD | Proportion of 32 to 60 meshes pass (%) | 4 meshes on (%) | MFR | YI |
| --- | --- | --- | --- | --- | --- | --- | --- |
| Example 12 | 5,100 | 99.3 | 0.48 | 90.8 | 0 | 4.3 | 2.9 |
| Example 13 | 5,000 | 99.0 | 0.46 | 92.5 | 0 | 3.8 | 2.8 |
| Example 14 | 5,000 | 98.8 | 0.45 | 92.0 | 0 | 3.8 | 2.8 |
| Example 15 | 5,100 | 98.9 | 0.45 | 92.0 | 0 | 3.6 | 2.9 |
| Example 16 | 5,000 | 99.5 | 0.48 | 96.5 | 0 | 3.8 | 2.9 |
| Example 17 | 5,800 | — | 0.46 | 92.0 | 0 | 4.1 | 2.3 |

EXAMPLE 18

Preliminary activation was carried out as in Example 1, (1) and (2). To the resulting catalyst were added 1,000 ml of n-hexane, and further 150 ml of hydrogen. Slurry polymerization reaction was then carried out under a partial pressure of propylene of 12 kg/cm²G, at 70° C. for 2.5 hours, followed by removing n-hexane by steam stripping to obtain a polymer.

EXAMPLE 19

A preliminarily activated catalyst was prepared as in Example 1, (1) and (2), and after introducing 300 ml of hydrogen, and further 600 g of propylene, bulk polymerization was carried out under a partial pressure of propylene of 31 kg/cm²G at 70° C. for one hour. After completion of the reaction, unreacted propylene was purged, and post-treatment was carried out as in Example 1 to obtain a polymer.

EXAMPLE 20

A powdery, preliminarily activated catalyst was prepared in a reactor as in Example 1, (1) and (2). After introducing 300 ml of hydrogen and 200 g of propylene, bulk polymerization was carried out under a partial pressure of propylene of 26 kg/cm²G at 60° C. for 30 minutes to give 35 g of reacted propylene. Thereafter, while the resulting slurry containing unreacted propylene was flushed into a fluidized bed having a diameter of 20 cm and a volume of 20 l and equipped with agitating elements, and also propylene was circulated at a flow rate of 5 cm/sec to fluidize polymer, gas phase polymerization was carried out under a partial pressure of propylene of 21 kg/cm²G at a reaction temperature of 70° C. for 2 hours. The subsequent post-treatment was carried out as in Example 1 to obtain a polymer.

EXAMPLE 21

Bulk polymerization was carried out under 26 kg/cm²G at 60° C. for 30 minutes, as in Example 8. Thereafter, unreacted liquefied propylene was transferred in a separate feed tank connected to the reactor. The temperature of the reactor was elevated to 72° C., and while propylene was fed from the feed tank to the reactor so as to give a polymerization pressure of 26 kg/cm²G, gas phase polymerization was carried out for 2 hours. The subsequent post-treatment was carried out as in Example 1 to obtain a polymer.

EXAMPLE 22

Bulk polymerization was carried out under 26 kg/cm²G, at 60° C. for 30 minutes as in Example 20. Thereafter the polymerization temperature was elevated to 70° C. to give a polymerization pressure of 31 kg/cm²G. When polymerization was continued as it was, the pressure lowered to 26 kg/cm² in 40 minutes. Thus, the bulk polymerization turned continuously to gas phase polymerization. Further, while propylene was fed so as to maintain 26 kg/cm²G for 60 minutes, gas phase polymerization was carried out. The subsequent post-treatment was carried out as in Example 1 to obtain a polymer.

EXAMPLE 23 n-Hexane (1,000 ml), diethylaluminum monochloride (320 mg) and solid product (III) (18 mg) obtained in Example 5 were fed, and propylene was reacted under a partial pressure of propylene of 1.2 kg/cm²G at 20° C. for 10 minutes to carry out preliminary activation (reacted propylene per g of solid product (III): 0.6 g). Unreacted propylene was purged, and 120 ml of hydrogen was introduced. Slurry polymerization was carried out under a partial pressure of propylene of 10 kg/cm²G at 70° C. for 2.5 hours. n-Hexane was removed by steam stripping to obtain a polymer.

EXAMPLE 24 n-Pentane (80 ml), diethylaluminum monochloride (280 mg) and solid product (III) (25 mg) obtained in Example 5 were fed. Propylene was reacted at 15° C. while its partial pressure was elevated. Pressure was elevated to 5 kg/cm²G in 5 minutes (1 kg/cm²G/min.) to carry out preliminary activation in 5 minutes (reacted propylene per solid product (III): 3.2 g). Unreacted propylene was purged, and 200 ml of hydrogen was introduced.

Slurry polymerization was carried out under a partial pressure of propylene of 10 kg/cm²G at 70° C. for 60 minutes (reacted propylene: 63 g). The resulting slurry containing solvent was introduced into a fluidized bed equipped with agitating elements, and gas phase polymerization of propylene was carried out as in Example 20.

EXAMPLE 25 n-Hexane (1,000 ml) diethylaluminum monochloride (320 mg) and solid product (III) (30 mg) obtained in Example 5 (1) were fed, and without preliminary activation, hydrogen (120 ml) was introduced, followed by slurry polymerization under a partial pressure of propylene of 10 kg/cm²G at 70° C. for 2.5 hours. n-Hexane was then removed by steam topping to obtain a polymer.

EXAMPLE 26

Employing a catalyst not subjected to preliminary activation, slurry polymerization of propylene was conducted as in Example 25. Thereafter, unreacted propylene and hydrogen were purged, and n-hexane was distilled off under reduced pressure until the resulting polymer contained 30% of n-hexane. This polymer containing the solvent was introduced into a fluidized bed equipped with agitating elements, employed in Example 20. Hydrogen (450 ml) was introduced, and gas phase polymerization was carried out under a partial pressure of propylene was 21 kg/cm²G at 70° C. for 2 hours, as in Example 20. The subsequent post-treatment was carried out as in Example 1 to obtain a polymer.

The results of Examples 18–26 are shown in Table 5.

TABLE 5

| No. | Polymer yield per g of solid catalyst component | Isotactic index | Polymer BD | Proportion of 32 to 60 meshes pass (%) | 4 meshes on (%) | MFR | YI |
| --- | --- | --- | --- | --- | --- | --- | --- |
| Example 18 | 5,400 | 99.8 | 0.48 | 97.6 | 0 | 2.6 | 2.3 |

TABLE 5-continued

| No. | Polymer yield per g of solid catalyst component | Isotactic index | Polymer BD | Proportion of 32 to 60 meshes pass (%) | 4 meshes on (%) | MFR | YI |
|---|---|---|---|---|---|---|---|
| Example 19 | 5,000 | 99.6 | 0.47 | 95.0 | 0 | 2.9 | 2.8 |
| Example 20 | 5,800 | 99.3 | 0.48 | 93.6 | 0 | 2.6 | 2.9 |
| Example 21 | 5,900 | 99.2 | 0.46 | 94.5 | 0 | 2.8 | 2.1 |
| Example 22 | 5,700 | 99.2 | 0.48 | 93.6 | 0 | 2.8 | 2.4 |
| Example 23 | 5,300 | 99.6 | 0.50 | 93.2 | 0 | 1.8 | 2.6 |
| Example 24 | 5,800 | 99.0 | 0.49 | 92.0 | 0 | 2.4 | 2.8 |
| Example 25 | 4,500 | 98.2 | 0.45 | 91.0 | 0 | 1.6 | 3.5 |
| Example 26 | 5,980 | 98.5 | 0.45 | 90.0 | 0 | 1.8 | 2.1 |

EXAMPLE 27

Block copolymerization of propylene-ethylene was carried out as in Example 26 except that slurry polymerization of propylene was carried out as in Example 26, as a first step, and gas phase polymerization as a second step was carried out under a partial pressure of hydrogen of 8 kg/cm$^2$G and a partial pressure of ethylene of 12 kg/cm$^2$G, at 70° C. for 2 hours to polymerize ethylene.

EXAMPLE 28

Example 20 was repeated except that an α-olefin mixture of 200 g of propylene with 20 g of ethylene was employed in place of 200 g of propylene, to obtain a propylene-ethylene copolymer.

EXAMPLE 29

Example 28 was repeated except that butene-1 (30 g) was employed in place of 20 g of ethylene, to obtain a propylene-butene-1 copolymer.

EXAMPLE 30

Example 1 was repeated except that, employing the preliminarily activated catalyst, ethylene polymerization under 12 kg/cm$^2$G of hydrogen and a partial pressure of ethylene of 12 kg/cm$^2$G at 85° C. was carried out in place of propylene polymerization using 300 ml of hydrogen, under a partial pressure of propylene of 25 kg/cm$^2$G at 70° C., to obtain a polymer.

The results of Examples 27-30 are shown in Table 6.

TABLE 6

| No. | Polymer yield per g of solid catalyst component | Isotactic index | Polymer BD | Proportion of 32 to 60 meshes pass (%) | 4 meshes on (%) | MFR | YI |
|---|---|---|---|---|---|---|---|
| Example 27 | 5,900 | 98.0 | 0.45 | 90.0 | 0 | 1.6 | 2.3 |
| Example 28 | 5,900 | 98.1 | 0.46 | 91.5 | 0 | 3.6 | 2.1 |
| Example 29 | 5,800 | 98.5 | 0.46 | 90.0 | 0 | 3.8 | 2.0 |
| Example 30 | 5,300 | — | 0.45 | 90.0 | 0 | 4.2 | 2.5 |

EXAMPLE 31

Solid product obtained in Example 1 was stored at 30° C. for 4 months. Thereafter propylene polymerization was carried out as in Example 1, (2) and (3).

COMPARATIVE EXAMPLES 9-12

The respective solid products obtained in the following Example and Comparative examples were stored at 30° C. for 4 months. Thereafter, employing them in place of solid product (III), preliminary activation treatment and propylene polymerization were carried out as in Example 1, (2) and (3).

Comparative ex. 9: Solid product (II) obtained in Example 1
Comparative ex. 10: Final solid product obtained in Comparative ex. 4
Comparative ex. 11: Final solid product obtained in Comparative ex. 6.
Comparative ex. 12: Final solid product obtained in Comparative ex. 7.

The results of Example 31 and Comparative examples 9-12 are shown in Table 7.

TABLE 7

| No. | Polymer yield per g of solid catalyst component | Isotactic index | Polymer BD | Proportion of 32 to 60 meshes pass (%) | 4 meshes on (%) | MFR | YI |
|---|---|---|---|---|---|---|---|
| Example 31 | 4,600 | 99.0 | 0.45 | 91.8 | 0 | 4.1 | 3.0 |
| Compar. ex. 9 | 600 | 98.0 | 0.40 | 55.0 | 25 | 4.3 | 18 |
| Compar. ex. 10 | 1,200 | 95.0 | 0.40 | 75.0 | 18 | 4.1 | 14 |
| Compar. ex. 11 | 700 | 96.0 | 0.40 | 53.0 | 18 | 4.3 | 18 |

TABLE 7-continued

| No. | Polymer yield per g of solid catalyst component | Isotactic index | Polymer BD | Proportion of 32 to 60 meshes pass (%) | 4 meshes on (%) | MFR | YI |
|---|---|---|---|---|---|---|---|
| Compar. ex. 12 | 900 | 95.1 | 0.40 | 52.0 | 19 | 3.8 | 16 |

EXAMPLE 32

Solid product (III) (300 mg) obtained in Example 1 and diethylaluminum monochloride (3,000 mg) were suspended in n-hexane (200 ml), followed by reaction under a partial pressure of propylene of 1.3 kg/cm²G at 20° C. for 10 minutes, purging unreacted propylene and storing with stirring at 30° C. for one week. The resulting catalyst slurry containing 25 mg of solid product (III) was introduced into a polymerization vessel, to carry out slurry polymerization and gas phase polymerization of propylene.

COMPARATIVE EXAMPLES 13–16

Employing the following respective solid products in place of solid product (III) obtained in Example 1, catalyst slurries were stored at 30° C. for one week as in Example 32, followed by propylene polymerization.

Comparative ex. 13: Solid product obtained in Example 1
Comparative ex. 14: Final solid product obtained in Comparative ex. 4
Comparative ex. 15: Final solid product obtained in Comparative ex. 6
Comparative ex. 16: Final solid product obtained in Comparative ex. 7

The results of Example 32 and Comparative examples 13–16 are shown in Table 8.

TABLE 8

| No. | Polymer yield per g of solid catalyst component | Isotactic index | Polymer BD | Proportion of 32 to 60 meshes pass (%) | 4 meshes on (%) | MFR | YI |
|---|---|---|---|---|---|---|---|
| Example 32 | 4,900 | 98.5 | 0.45 | 90.0 | 0 | 2.3 | 2.9 |
| Comparat. ex. 13 | 700 | 97.5 | 0.32 | 50.0 | 28 | 4.2 | 18 |
| Comparat. ex. 14 | 1,300 | 94.8 | 0.30 | 61.0 | 22 | 4.3 | 13 |
| Comparat. ex. 15 | 800 | 95.8 | 0.31 | 62.0 | 24 | 4.2 | 17 |
| Comparat. ex. 16 | 1,280 | 94.8 | 0.29 | 49.0 | 35 | 3.8 | 12 |

EXAMPLE 33

A combination of slurry polymerization with gas phase polymerization was carried out as in Example 24 except that slurry polymerization at 78° C. using solid product (III) obtained in Example 1 was carried out in place of slurry polymerization at 70° C. using solid product (III) obtained in Example 5.

COMPARATIVE EXAMPLE 18

Employing solid product (II) obtained in Example 1 in place of solid product (III) obtained in Example 1, slurry polymerization of propylene was carried out at 78° C., followed by gas phase polymerization, as in Example 33. At the stage where slurry polymerization of propylene was carried out at 78° C., polymer was swelled with n-pentane, and at the stage of gas phase polymerization, polymer caused no fluidization but formed a lump.

COMPARATIVE EXAMPLE 19

Employing the final solid product obtained in Comparative example 7, in place of solid product (III) obtained in Example 1, slurry polymerization of propylene was carried out at 78° C., followed by gas phase polymerization, as in Example 33. At the stage where slurry polymerization was carried out at 78° C., polymer was swelled with n-pentane, and at the stage of gas phase polymerization, polymer caused no fluidization, but formed a lump.

The results of Example 33 and Comparative examples 18 and 19 are shown in Table 9.

TABLE 9

| No. | Polymer yield per g of solid catalyst component | Isotactic index | Polymer BD | Proportion of 32 to 60 meshes pass (%) | 4 meshes on (%) | MFR | YI |
|---|---|---|---|---|---|---|---|
| Example 33 | 5,950 | 98.2 | 0.49 | 91.0 | 0 | 2.9 | 2.0 |
| Comparat. ex. 18 | 400 | 92.0 | — | — | — | 2.3 | >20 |
| Comparat. ex. 19 | 180 | 90.0 | — | — | — | 2.1 | >20 |

EXAMPLE 34 AND COMPARATIVE EXAMPLE 20

EXAMPLE 34

The solid products (III) obtained in Examples 1, 4, 6 and 11 were subjected to measurements of specific surface area and surface infrared spectra, X ray diffraction, analyses of Al, Ti, Cl and diisoamyl ether and observation with an optical microscope. The results are shown in Table 10 and Infrared spectra FIG. 1.

In FIGS. 1 and 2, measurement was carried out under the following conditions: sampling rate: 1.00, resolution: 4.00 and times: 300.

TABLE 10

| | Specific surface area $m^2/g$ | Hydroxyl group | X ray diffraction | | | | | | Analysis of composition (mg/g) | | | | |
|---|---|---|---|---|---|---|---|---|---|---|---|---|---|
| | | | | | | | | | Al | Ti | Cl | Electron donor | Canal |
| Example 1 | 138 | none | 4.85 m,broad | 2.71 s | 2.15 w | 1.77 m | 1.70 w | 1.48 ww | 0.89 | 252 | 541 | 100 | Yes |
| Example 4 | 142 | none | 4.90 s | 2.73 s | 2.13 m | 2.00 w | 1.78 m | 1.49 w | 0.80 | 254 | 545 | 120 | Yes |
| Example 6 | 135 | none | 4.87 s | 2.71 s | 2.15 m | 1.77 m | 1.70 w | 1.48 w | 0.60 | 256 | 548 | 115 | Yes |
| Example 11 | 130 | none | 5.02 s | 2.72 s | 2.13 m | 1.98 w | 1.78 m | 1.48 w | 1.00 | 265 | 589 | 90 | Yes |
| Comparative ex. 20 | 180 | Yes | 5.85 m | 5.27 m | 2.97 w | 2.71 s | 1.77 m | 1.70 w | 2.5 | 271 | 600 | 75 | None |

Intensity: s > m > w > ww (1) Measurement of specific surface area:
Specific surface area was measured at the temperature of liquid nitrogen, according to one point BET method, employing Micromeritics specific surface area-automatic measurement apparatus 2200.

(2) Measurement of surface infrared spectra:
The diffuse reflection spectra of samples sandwiched between two KRS-5 plates were measured employing Fourier transform spectrophotometer (JIR-400) manufactured by Nihon Denshi Kabushiki Kaisha.

(3) X ray diffraction:
X ray diffraction was carried out according to powder method employing a goniometer (PMG-S2) manufactured by Rigaku Denki Kabushiki Kaisha and also employing Cu Kα line ($\lambda = 1.54$ A) and Ni as filter, at 40 KV and 20 mA.

(4) Analysis of composition:
Weighed samples were decomposed with water, followed by analyzing Al and Ti according to atom absorption method. Electron donors were extracted with n-hexane, followed by measurement according to gas chromatography. The content was calculated from the calibration curve.

(5) Observation with optical microscope:
Samples sandwiched between glass plates were observed by an optical microscope (manufactured by Olympus Kogaku Co.).

COMPARATIVE EXAMPLE 20

For comparison, a catalyst complex prepared according to Example 1 described in the specification of Japanese patent application laid-open No.Sho 47-34478/1972 (U.S. Pat. No. 4,210,738) was measured. The results are shown in Table 10 and Infrared spectra FIG. 2.

COMPARATIVE EXAMPLE 21

Substituting the catalyst complex obtained in Comparative example 20, for the solid product (III), propylene polymerization was carried out as in Example 1. The polymer yield per g of the catalyst complex was 3,000 g.

EXAMPLE 35 AND COMPARATIVE EXAMPLE 22

The solid product (III) obtained in Example 1 and the catalyst complex obtained in Comparative example 20 were heated in nitrogen gas atmosphere at 55° C. for 4 days, followed by cooling and then propylene polymerization as in Example 1. The solid product (III) obtained in Example 1 was superior in the thermal stability and the reduction in the polymer yield was 5% or less, whereas, in the case of the catalyst complex obtained in Comparative example 20, the reduction in the polymer yield was as high as 71%. The results are in Table 11.

TABLE 11

| Nos. of Examples and Comparative examples | Polymer yield per g of solid product (III) or catalyst complex (g) | Isotactic index | Polymer BD | Proportion of 32 to 60 meshes (%) | 4 meshes-on (%) | MFR | YI |
|---|---|---|---|---|---|---|---|
| Comparative ex. 21 | 3,000 | 98.0 | 0.45 | 93.0 | 0 | 3.2 | 1.6 |
| Example 35 | 4,980 | 99.6 | 0.50 | 97.0 | 0 | 4.1 | 1.0 |
| Comparative ex. 22 | 870 | 93.0 | 0.45 | 93.5 | 0 | 3.8 | 6.0 |

What is claimed is:
1. A process for producing α-olefin polymers which comprises:
  reacting one mole of an organoaluminum compound with 0.1 to 8 mols of an electron donor in a solvent at a temperature of −20° to 200° C., to obtain a reaction product (I);
  reacting this reaction product (I) with $TiCl_4$ at a temperature of 10° to 90° C. in a ratio of the number of Al atoms to that of Ti atoms of 0.05 to 10, and thereafter removing a liquid portion from the resulting material followed by washing to thereby obtain a solid product (II) having no free $TiCl_4$;
  reacting 100 g of this solid product (II) with 10 to 1,000 g of an electron donor and 10 to 1,000 g of an electron acceptor at a temperature of 40° C. to 200° C. to obtain a solid product (III); and polymerizing an α-olefin or α-olefins in the presence of a catalyst comprising a combination of said solid product (III) with an organoaluminum compound, said catalyst being a preliminarily activated one obtained by further reacting an α-olefin with said combination.

2. A process according to claim 1 wherein said α-olefin polymerization is carried out by slurry polymerization followed by gas phase polymerization.

3. A process according to claim 1 wherein said α-olefin polymerization is carried out by bulk polymerization followed by gas phase polymerization.

4. A process according to claim 1 wherein said organoaluminum compound has the general formula

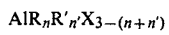
$AlR_nR'_{n'}X_{3-(n+n')}$ wherein R and R' each represent alkyl, aryl, alkaryl, cycloalkyl or alkoxy group; X represents fluorine, chlorine, bromine or iodine; and n and n' each represent a number which must satisfy a relationship of $0 < n + n' \leq 3$.

5. A process according to claim 1 wherein said electron donors may be the same or different and are each at least one member selected from the group consisting of ethers, alcohols, esters, aldehydes, fatty acids, aromatic acids, ketones, nitriles, amines, amides, urea, thiourea, isocyanates, azo compounds, phosphines, phosphites, phosphinites, thioethers and thioalcohols.

6. A process according to claim 1 wherein said electron donors may be the same or different and are composed singly or mainly of ethers and those other than ethers are employed together with ethers.

7. A process according to claim 1 wherein said electron acceptor is at least one member selected from the group consisting of anhydrous $AlCl_3$, $SiCl_4$, $SnCl_2$, $SnCl_4$, $TiCl_4$, $ZrCl_4$, $PCl_3$, $PCl_5$, $VCl_4$ and $SbCl_5$.

8. A process according to claim 1 wherein said solvent is an aliphatic hydrocarbon.

9. A process according to claim 1 wherein said reaction of said solid product (II) with an electron donor and an electron acceptor is carried out in an aliphatic hydrocarbon.

10. A process according to claim 1 wherein said reaction of said solid product (II) with an electron donor and an electron acceptor is carried out by reacting said electron donor with said electron acceptor in advance at a temperature of 10° to 100° C. for a time of 30 minutes to 2 hours; cooling the resulting reaction product; and reacting this reaction product with said solid product (II).

11. A process for producing α-olefin polymers which comprises:

reacting one mole of an organoaluminum compound with 1 to 4 mols of an electron donor in 0.5 to 5 l of a solvent of an aliphatic hydrocarbon at a temperature of $-10°$ to 100° C., to obtain a reaction product (I);

reacting this reaction product (I) with $TiCl_4$ at a temperature of 10° to 90° C. in a ratio of the number of Al atoms to that of Ti atoms of 0.06 to 0.2, and thereafter removing a liquid portion from the resulting material followed by washing, to obtain a solid product (II) having no free $TiCl_4$;

reacting 100 g of this solid product (II) with 50 to 200 g of an electron donor and 20 to 500 g of an electron acceptor in 0.1 to 1 l of a solvent of an aliphatic hydrocarbon at a temperature of 50° to 100° C. to obtain a solid product III; and polymerizing α-olefin or α-olefins in the presence of a catalyst comprising a combination of said solid product (III) with an organoaluminum compound.

* * * * *